Aug. 5, 1952 — E. W. SMITH — 2,605,860
VEHICLE BRAKING APPARATUS
Filed July 21, 1947
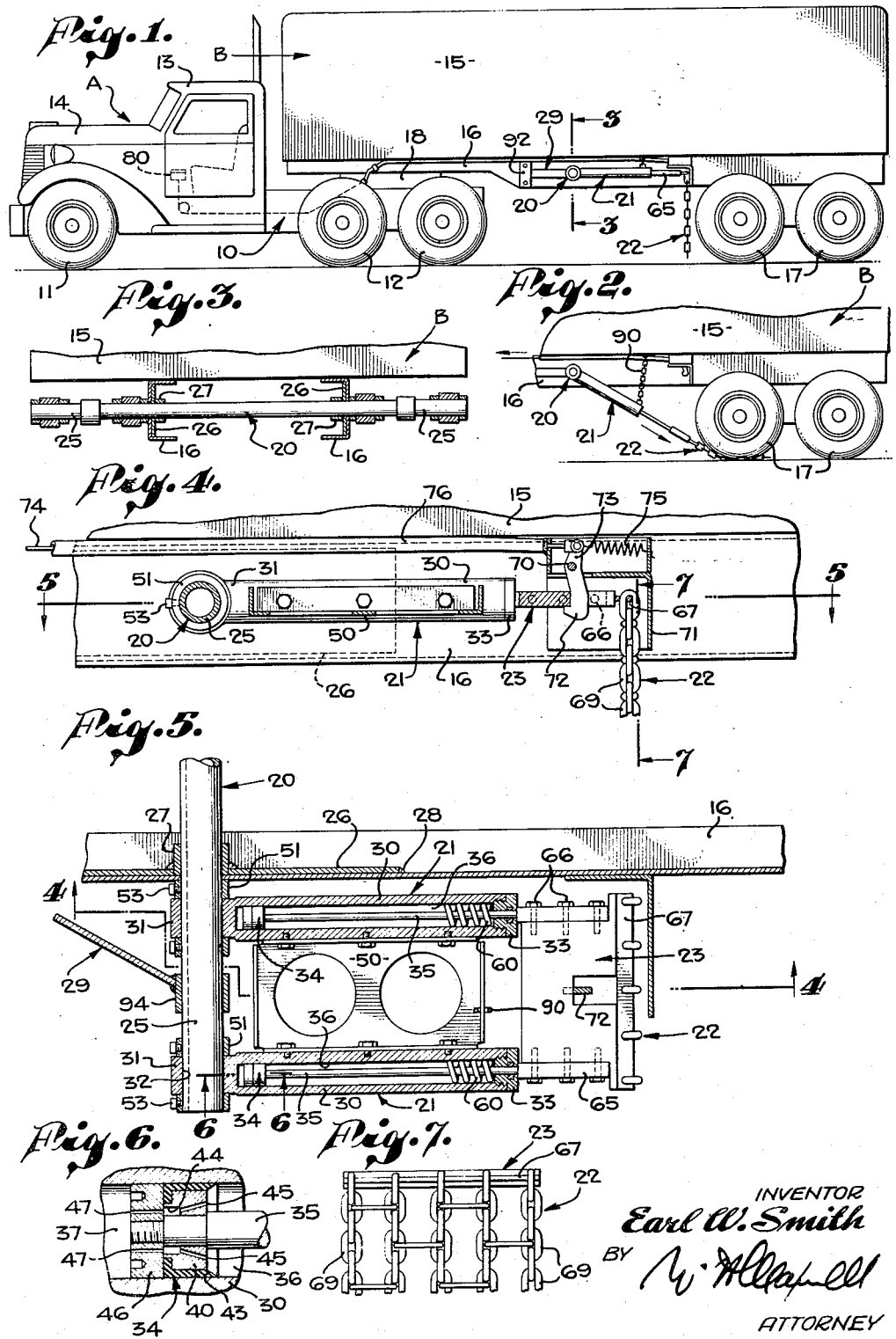
INVENTOR
Earl W. Smith
BY
ATTORNEY Patented Aug. 5, 1952

2,605,860

UNITED STATES PATENT OFFICE 2,605,860

VEHICLE BRAKING APPARATUS

Earl W. Smith, Fresno, Calif., assignor of one-half to Louis Dopyera, Jackson, Wyo.

Application July 21, 1947, Serial No. 762,371

8 Claims. (Cl. 188—4)

This invention relates to vehicle braking apparatus and it is a general object of the invention to provide a simple, practical, effective vehicle brake or stop having a cushioned action relieving the structure and the vehicle of excessive strain.

This invention relates to the general type of vehicle braking equipment which is fully disclosed and claimed in my copending application entitled "Method and Apparatus for Controlling Vehicles," Serial No. 737,950, filed March 26, 1947, now abandoned.

An object of the present invention is to provide a simple, dependable, quick-acting braking apparatus involving a mat insertable under the wheels of the vehicle and including a fluid pressure means serving to cushion the coupling between the mat and vehicle to relieve the active parts of excessive strains.

Another object of the present invention is to provide apparatus of the general character referred to involving a pivoted arm construction coupling the mat to the vehicle and serving to effectively support the mat in position for the desired action under the wheels of the vehicle.

Another object of the present invention is to provide apparatus of the general character referred to in which the parts are so arranged and related that gravity acts on the mats and the supporting arms to move these parts into working position, making springs or other actuating means unnecessary.

The various objects and features of my invention will be fully understood from the following detailed description of a typical preferred form and application of my invention, throughout which description reference is made to the accompanying drawings, in which:

Fig. 1 is a side elevation of a typical commercial vehicle showing rear wheels thereof equipped with the braking apparatus provided by the present invention. Fig. 2 is a view of the rear portion of the vehicle showing the braking apparatus of the present invention applied or in working position. Fig. 3 is an enlarged detailed transverse sectional view taken as indicated by line 3—3 on Fig. 1. Fig. 4 is an enlarged longitudinal sectional view of the equipment provided by the present invention, being a view taken as indicated by line 4—4 on Fig. 5. Fig. 5 is a plan section of the equipment, being a view taken as indicated by line 5—5 on Fig. 4. Fig. 6 is an enlarged detailed sectional view taken as indicated by line 6—6 on Fig. 5, and Fig. 7 is a fragmentary view taken as indicated by line 7—7 on Fig. 4.

The present invention is applicable, generally, to motor vehicles and it is particularly useful and practical as applied to commercial vehicles or trucks which are exceedingly difficult to adequately brake with equipment ordinarily available. The apparatus provided by the present invention is such that it may be applied to or operated in connection with various wheels of a vehicle, it being preferred ordinarily that it be applied to wheels at the rear end portion of a vehicle.

In the drawings I have shown one simple or typical application of the structure that I have provided and I have there illustrated a vehicle of a modern commercial type, being a heavy motor vehicle involving, generally, a tractor or power unit A and a trailer or trailing unit B partially supported and drawn by the unit A. The particular tractor unit A shown in the drawings involves a frame 10 supported at its forward end by front wheels 11 and at its rear end by two pairs of rear wheels 12. The frame carries a cab 13 and an engine hood 14 arranged and related in the manner common to devices of this character. The trailer unit B involves, generally, a load carrying body 15 mounted on an elongate frame 16, the rear end portion of the frame being supported by two pairs of rear wheels 17 while the forward end portion of the frame is supported on or from the tractor A through a suitable swivel connection 18.

As above pointed out, the equipment provided by this invention may be applied to various wheels of the vehicle and various numbers of units embodying the invention may be employed. As a typical application of the present invention I have shown units located and arranged to cooperate with the forward pair of rear wheels 17.

The structure of the present invention involves, generally, a fixed base member 20 preferably in the form of a beam and preferably applied to the frame of the vehicle being braked, as for instance to the frame 16, to extend transversely thereof. In the typical simple arrangement illustrated braking units are carried by the beam and each includes one or more arms 21 pivotally carried by the frame and a tread member or mat 22 coupled to the arms preferably by a cross head 23, or the like.

The base member or beam 20 is preferably a simple, elongate rigid part, say for example a tubular member carried by the vehicle frame 16 to extend transversely thereof and to have end portions 25 projecting from or beyond the sides of the frame. In the particular case illustrated the beam 20 is shown extending through the frame 16 and at the point where the frame carries the beam the frame is reinforced by plates 26 carrying box-like parts 27 in which the beam is held. In practice the plate 26 may be fixed or joined to the frame in any suitable manner, as by welding 28.

The end portions 25 of the beam project a substantial distance laterally from the frame 16 so that they extend to positions forward of the wheels 17 that are to be braked. In practice the wheels 17 are multiple wheels, that is, each wheel involves two or more tires in which case the end portions 25 are of substantial length. I prefer to provide braces 29 to stiffen and further support the projecting end portions 25 of the beam. In the arrangement illustrated there is a single brace at each side of the frame 16 and each brace is provided with a plate portion 92 suitably secured or anchored to the frame 16 at a point forward of the beam. The brace extends outwardly and rearwardly from the plate portion 92 to the end portion of the beam remote or spaced from the frame 16 where the brace has a portion 94 surrounding the beam as clearly illustrated in the drawings. It will be apparent that the brace 29 may be varied widely in form and design and may engage the projecting portion of the beam at various points along its length. The arrangement shown in the drawings is typical and is one in which the brace engages the projecting end portion 25 at a point about midway between its ends.

Each unit carried by a projecting end portion of the beam preferably involves one or more arms 21, the arms being elongate rigid elements pivotally connected to the end portion of the beam and serving as a coupling between the mat 22 and the beam. In the drawings where I show a typical arrangement there are two arms 21 of like construction one carried on the inner part of beam portion 25 and the other carried on the outer part of beam portion 25 so that one occurs inward of the bracket part 94 while the other occurs outward thereof.

Each arm 21 is a fluid pressure mechanism and as shown in the drawings it may involve an elongate cylinder 30 provided at its inner end with a head 31 having a bore 32 receiving the end portion 25 of the beam. The outer end portion of the cylinder 30 is provided with a closure or cap 33. A piston 34 operates in the cylinder 30 and is carried on a piston rod 35 which is slidably carried in the cap 33.

In accordance with my invention the piston 34 divides the cylinder into an outer or pressure chamber 36 and an inner receiving chamber 37. In accordance with my invention the structure is such that as the device operates the piston 34 may move outwardly in the cylinder 30 but its movement is retarded or checked by fluid in the pressure chamber 36.

Any suitable by-pass connection may be provided between the end portions of the cylinder 30, it being preferred, in practice, to provide by-pass means in the piston 34. In the case illustrated the piston is shown as involving a piston head 40 carried on the end of rod 35 and carrying a suitable packing ring 43. The head 40 is formed with an annular chamber 44 in free communication with the pressure chamber 36 through ports 45. A retainer 46 is threaded on the end of rod 35 and retains the head 40 on the rod. The retainer is provided with one or more control ports 47 that communicate with the chamber 44, the assembly forming a passage through the piston restricted at the control parts 47.

The number and size of the control ports 47 determines the rate at which fluid is allowed to escape from pressure chamber 36 into the receiving chamber 37. If the fluid employed is oil or the like the ports 47 are made such as to accommodate the desired flow of oil and may be of substantial size whereas if air is the fluid employed the ports 47 may be rather small so that they allow very little escape of air upon rapid operation of the apparatus, and consequently cause the air in chamber 36 to be compressed and thereby have a checking effect, the compressed air being allowed to escape through the ports 47 after the device is fully operated.

Where a plurality of arms 21 such as I have just referred to are employed in the construction it is desirable to employ a web or spacer 50 between them which element may be fixed to the cylinder 30 and may be shaped and proportioned to extend between the cylinders keeping the arms the desired distance apart, keeping them parallel and keeping them in the same rotative position on the portion 25 of the beam. Further, in practice I prefer to provide stop collars 51 on the beam at each side of the heads 31 of the cylinders which stop collars are provided with set screws 53 or the like so that they can be set in a manner to hold the unit in the desired position lengthwise of beam portion 25. In the drawings I have shown stop collars at each side of each head 31.

Further, in practice I prefer to provide cushion springs 60 in the compression chambers 36 between the piston 34 and the cap 33. I may if I so desire provide springs that will have continuous engagement with the caps and the pistons to normally position the parts as shown in Fig. 4 or I may provide short springs, as illustrated in the drawings, adjacent the caps 33 which springs serve to supplement the cushioning action of the fluid in the cylinders and become fully compressed as the device is fully operated, and when fully compressed they form positive stops limiting outward movement of the rods 35 from the cylinder.

The cross head 23 is preferably provided primarily as an effective holder for the mat 22 and where two or more arms 21 are used it is preferred that they each be joined to the cross head. In the case illustrated each rod 35 is provided on its outer end with a coupling part 65 joined to the cross head 23 as by screw fasteners 66, or the like. The cross-head 23 may be a plate-like element with its outer edge portion 67 shaped and proportioned to advantageously receive the mat 22.

The mat 22 is preferably a flexible member or a tread member such that it may be moved to a position to extend beneath the wheels with which the device cooperates so that the mat itself bears on the pavement over which the vehicle is operating and drags while the wheel or wheels, as the case may be, bear on the mat so that their treads are protected and so that they no longer turn. In the particular form of the invention illustrated I have shown a mat 22 formed of a plurality of links 69 which may be chain-like links joined together into a mat, preferably rectangular in shape and of such extent as to extend beneath the wheels to be braked when the device is operated, as shown in Fig. 2 of the drawings.

In accordance with the general arrangement provided by my invention when the structure is out of operation the arm 21, or the units formed by the several arms 21, is up or horizontally disposed, as shown in Fig. 1 of the drawings, and extends either forward or rearward from the supporting beam as circumstances require. In the particular case illustrated I have shown an arrangement wherein the arms 21 project rearwardly from the beam. As the arms project horizontally or rearwardly the pistons 34 are at the inner ends of the cylinders 30 and the cross head 23 is adjacent the caps 33 at the outer ends of the cylinders. The mat 22 joined or linked to the cross head 23 may depend loosely or freely from the cross head, it being preferred to shape and proportion the mat so that as it depends in the position shown in Fig. 1 it clears the ground or surface over which the vehicle operates and is immediately forward of the wheels with which it is to cooperate, but does not touch them.

When the device is to be operated the arms 21 are allowed to move down from the position shown in Fig. 1 to that shown in Fig. 2, which operation causes the lower end portion of the mat to engage the surface of the pavement and to become caught beneath the wheels 17. As the mat enters beneath the wheels 17 rearward pressure or strain is placed upon the cross head carrying the mat with the result that the pistons 34 on the rods coupled to the cross head are moved rearwardly in the cylinders, their movement being checked by the fluid action hereinabove described.

I provide a latch means for releasably retaining the arms or assembly of arms in the up position, as shown in Fig. 1. In the drawings I show a latch carried on a pivot pin 70 located at a bracket 71 mounted on the frame 16. The latch has a head 72 which engages and cooperates with the cross head 23, as shown in Figs. 4 and 5, and it has a lever arm 73 engaged by an operating line 74. A spring 75 normally yieldingly holds the latch in engaged position, as shown in Fig. 4. The operating line 74 extends through a suitable guide means 76 to the cab 13 of the tractor A where it may be equipped with a handle 80 or the like so that the operator can, whenever desired, operate the line to release the latch.

In accordance with the preferred form of my invention I provide a stop means serving to stop downward movement of the arms in position where the arms are in substantial alignment between the beam and the portion of the mat engaged under the wheels of the vehicle. The particular stop means illustrated in the drawings is a stop chain 90 having its upper end attached to a part of the vehicle, with the frame or body, and its lower end attached to the outer end portion of the unit formed by the cylinders 30 connected by the web 50.

From the foregoing description it will be apparent that the mechanism that I have provided is such that it can be readily and practically applied to a conventional or typical commercial motor vehicle so that the beam 20 is carried by the frame of the vehicle and so that the wheel engaging units are supported by the beam so that they normally are clear of all working parts so that they are in no way inconvenient or conspicuous and yet are always ready for immediate operation. It is to be observed that through my construction the wheel engaging units are located to be completely engaged beneath the wheels of the vehicle and the sudden severe forces communicated to the equipment are effectively absorbed or damped by the fluid pressure means that I have provided.

It will be apparent that with the structure that I have provided that in the event the trailer B should become detached from the tractor A the latch will release without manual operation. If the two vehicles A and B part while in motion the operating line is pulled taut thereby releasing the latch. After the latch has been released further separation of the vehicles will part or break the operating line. This self-acting character of the structure is a desirable safety feature which prevents runaway vehicles such as a driverless trailer.

Having described only a typical preferred form and application of my invention, I do not wish to be limited or restricted to the specific details herein set forth, but wish to reserve to myself any variations or modifications that may appear to those skilled in the art and fall within the scope of the following claims.

Having described my invention, I claim:

1. A structure applicable to a vehicle having a frame and a pair of supporting wheels including, a beam applicable to the frame to have projecting end portions, a mechanism on each end portion of the beam including, spaced pivoted arms, and a wheel engaging mat carried by the arms, each arm including a pivoted cylinder and a fluid controlled piston operable in the cylinder.

2. A structure applicable to a vehicle having a frame and a supporting wheel including, a beam applicable to the frame to extend transversely thereof forward of the supporting wheel, a chain mat engageable under the wheel, an arm pivotally carried by the beam, shock absorbing means supporting the mat from the outer end of the arm, and means normally releasably holding the arm in an up position substantially parallel with the frame and with the mat depending freely from the arm immediately forward of the wheel, the mat being engageable under the wheel by mere dropping of the arm.

3. A structure applicable to a vehicle having a frame and a supporting wheel including, a beam applicable to the frame to extend transversely thereof forward of the supporting wheel, a chain mat engageable under the wheel, an arm pivotally carried by the beam and extending rearwardly therefrom and fluid pressure shock absorbing means carried by the arm and supporting the mat, the mat depending freely from the arm immediately forward of the wheel when the arm is horizontally disposed to catch under the wheel when lowered by lowering of the arm.

4. A structure applicable to a vehicle having a frame and a supporting wheel including, a beam applicable to the frame to extend transversely thereof a substantial distance forward of the wheel, a mat engageable under the wheel, an arm carried by the beam to swing between an unactuated position where it extends rearwardly from the beam and is substantially horizontal and an actuated position where it extends downwardly and rearwardly from the beam, the arm having a cylinder opening therein, and a piston operable in the cylinder opening against fluid carried therein, the mat being carried by the piston to normally depend therefrom.

5. A structure applicable to a vehicle having a frame and a supporting wheel including, a beam applicable to the frame to have an end portion projecting laterally therefrom a substantial distance in front of the wheel, a brace between said projecting end portion of the beam and the frame, a fluid pressure shock absorber pivotally carried by said end portion of the beam, and a freely flexible mat wholly supported by the shock absorber to normally hang freely therefrom and engageable under the wheel of the vehicle when the shock absorber is in a lowered position.

6. A structure applicable to a vehicle having a frame and a supporting wheel including, a beam applicable to the frame to have an end portion projecting laterally therefrom a substantial distance ahead of the wheel, a brace between said projecting end portion of the beam and the frame, a fluid pressure shock absorber pivotally carried by said projecting end portion to extend rearwardly therefrom, a chain mat carried by the rear end of the shock absorber to normally hang freely therefrom to be engageable under the wheel of the vehicle by downward movement of the shock absorber from an elevated position, and a releasable latch normally holding the shock absorber in the elevated position where the mat is clear of the wheel immediately forward thereof.

7. A structure applicable to a vehicle having a frame and a supporting wheel including, a beam applicable to the frame to have an end portion projecting laterally therefrom, a brace between said projecting end portion and the frame, a fluid pressure shock absorber pivotally carried by said end portion to extend rearwardly therefrom, a chain mat carried by the rear end of the shock absorber to normally hang freely therefrom and to be engageable under the wheel of the vehicle, a releasable latch normally holding the shock absorber in an elevated position where the mat is clear of the wheel immediately forward thereof, and stop means for the shock absorber stopping it in position in line between the beam and the portion of the mat engaged under the wheel.

8. A structure applicable to a vehicle having a frame and a supporting wheel including, a beam applicable to the frame, a chain mat engageable under the wheel, a cylinder pivoted to the beam, and a piston operable in the cylinder against fluid carried therein, the mat being carried by the piston and normally hanging freely therefrom, the piston having a fluid bypass opening therethrough.

EARL W. SMITH.

REFERENCES CITED

The following references are of record in the file of this patent:

UNITED STATES PATENTS

| Number | Name | Date |
|---|---|---|
| 898,082 | Wolfe | Sept. 8, 1908 |
| 1,151,068 | Van Auken | Aug. 24, 1915 |
| 1,392,987 | Unruh | Oct. 11, 1921 |
| 1,455,576 | Elliott | May 15, 1923 |
| 1,582,911 | Eichorn | May 14, 1926 |
| 2,174,135 | Parrish | Sept. 26, 1939 |
| 2,344,148 | Jackson | Mar. 14, 1944 |
| 2,393,559 | Pappas | Jan. 22, 1946 |